Figure 10:
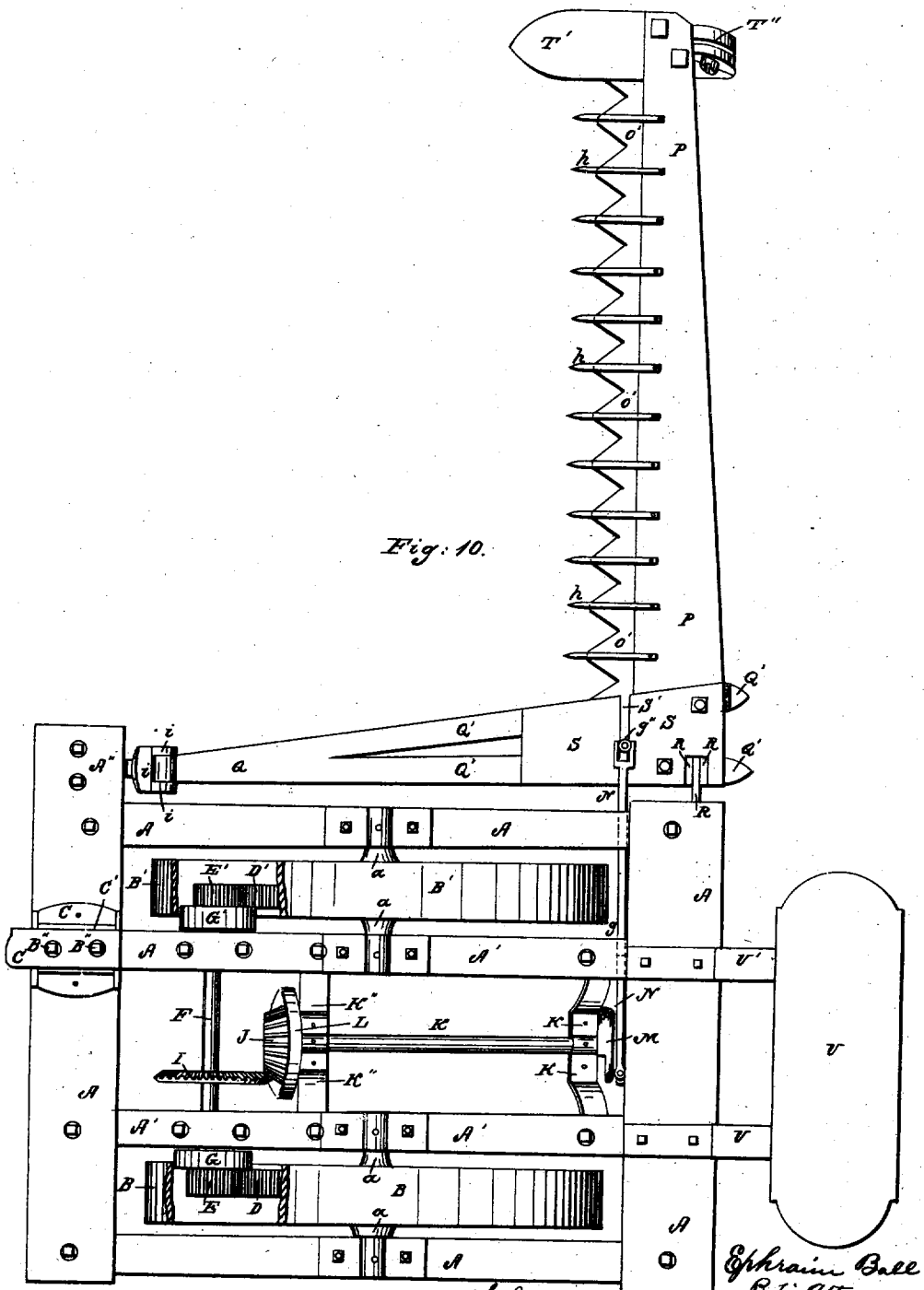

3 Sheets—Sheet 1.
E. BALL.
Mower.
No. 1,007.
Reissued July 17, 1860.
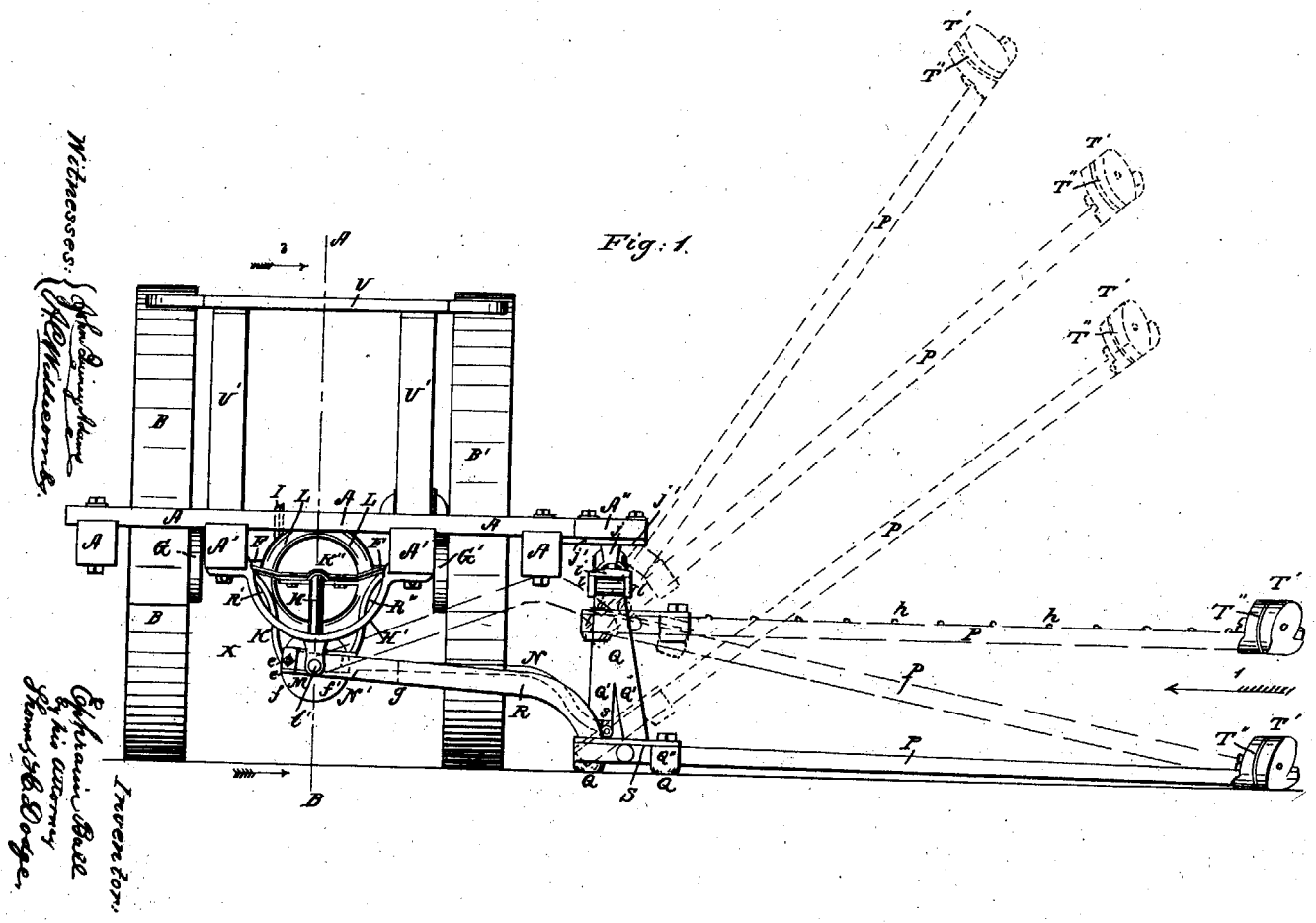
Witnesses: { John Quincy Adams, H. C. Widdecombe.
Inventor: Ephraim Ball, by his Attorney, Thomas H. Dodge.
N. PETERS, Photo-Lithographer, Washington, D. C.

3 Sheets—Sheet 2.
E. BALL.
Mower.
No. 1,007.
Reissued July 17, 1860.
Fig. 5.
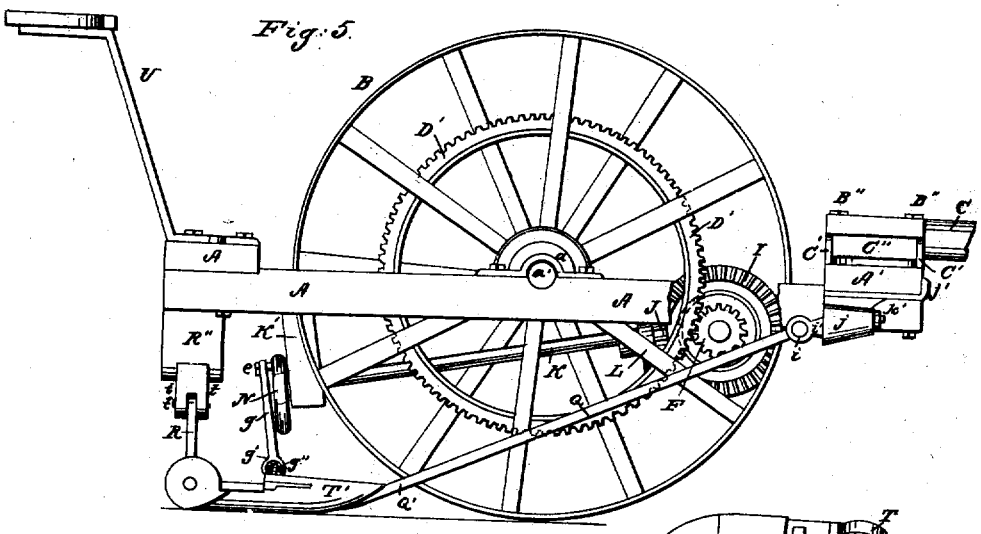
Fig. 7.
Fig. 6.
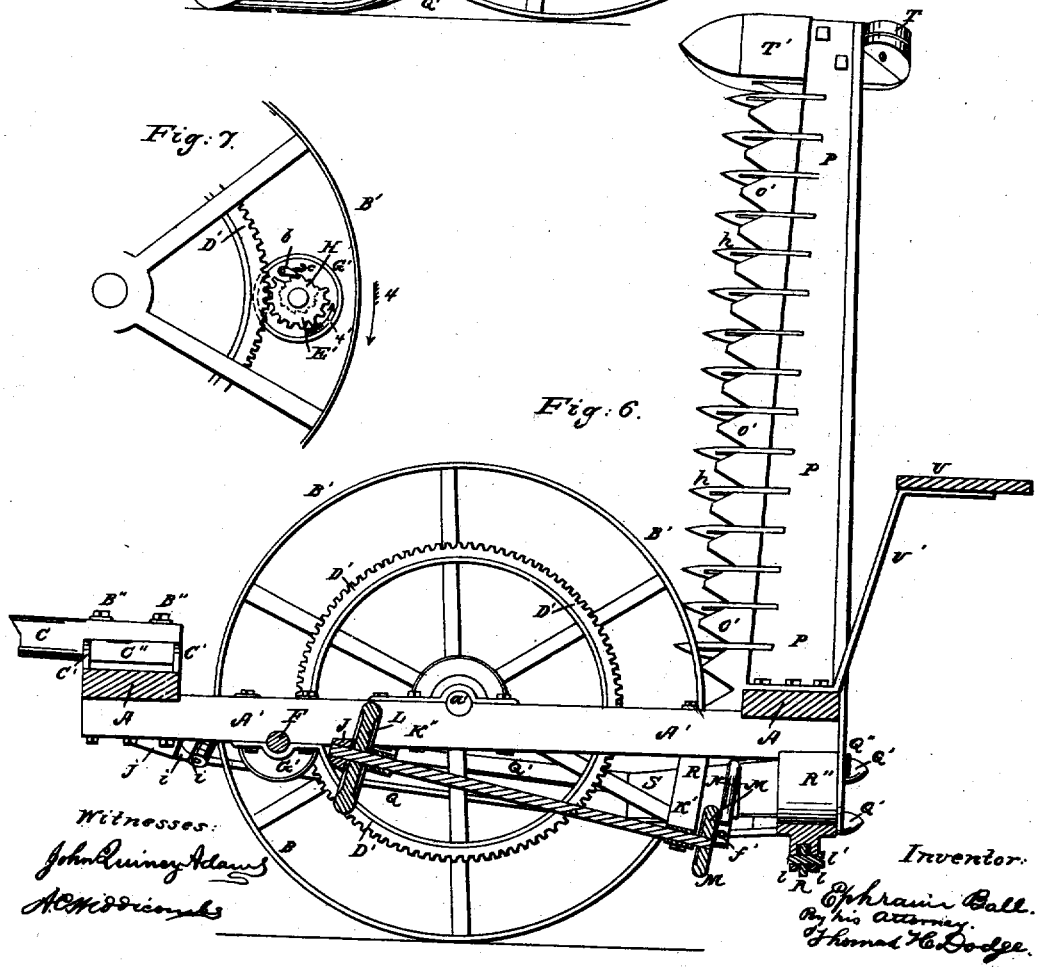
Witnesses:
John Quincy Adams
A. C. Middleton
Inventor:
Ephraim Ball.
By his attorney,
Thomas H. Dodge.
N. PETERS. Photo-Lithographer, Washington, D. C.

E. BALL.

3 Sheets—Sheet 3.

Mower.

No. 1,007.

Reissued July 17, 1860.

Witnesses: { John Quincy Adams, A. C. Widdicombe.

Inventor: Ephraim Ball, By his Atty., Thos. J. B. Dodge.

N. PETERS, Photo-Lithographer, Washington, D. C.

UNITED STATES PATENT OFFICE.

EPHRAIM BALL, OF CANTON, OHIO.

IMPROVEMENT IN MOWING-MACHINES.

Specification forming part of Letters Patent No. 18,788, dated December 1, 1857; Reissue No. 831, dated September 27, 1859; Reissue No. 1,007, dated July 17, 1860.

DIVISION A.

*To all whom it may concern:*

Be it known that I, EPHRAIM BALL, of Canton, in the county Stark, in the State of Ohio, have invented certain new and useful Improvements in Mowing-Machines, of which the following is a full, clear, and exact description, reference being had to the accompanying drawings, which make a part of this specification, and in which—

Figure 1 represents a rear view of the machine, the black lines showing the finger-beam resting upon the ground in the position it will occupy when the machine is mowing on a level surface, the blue lines showing one position of the finger-beam when mowing on an uneven surface with its left end raised to conform thereto, the red lines showing the position of the finger-beam when mowing on an uneven surface, which raises the entire finger-beam, the dotted black lines showing the position of the finger-beam raised up at its right or outer end toward the machine to pass over an obstacle, and the dotted red lines showing the finger-beam in two different positions raised off the ground and turned up toward the machine to pass over obstacles or through gates. Fig. 2 represents a side view of the machine, looking in the direction of arrow 1, Fig. 1, when the machine is mowing on level ground, a part of the main frame being represented as broken away to show the position of the gearing. Fig. 3 represents a section on a line A B, Fig. 1, looking in the direction of arrow 3, the finger-beam being shown in the highest position, represented in red dotted lines Fig. 1. Fig. 4 represents a detached view of a portion of one of the main wheels and a portion of its gearing, a part of the pinion which gears into one of the main gear-wheels being represented as broken away, together with its shield, to show one of the ratchet-wheels with its pawls, spring, and case, and by which motion is communicated from the main wheel to the main gear-shaft. Fig. 5 represents a detached plan or top view of one of the pinions on the main gear-shaft, together with its ratchet-wheel and pawl, the top of the case which covers the ratchet-wheel being represented as broken away to show the relative position of the parts. Fig. 6 represents a plan or top view of my machine, a portion of the peripheries of the wheels B B′ being broken away to show the gear-wheels.

Whenever it may be expedient to use one or more of the several parts or branches of my improvements separate from the rest, such part or parts may be used in connection with proper frames and gearing, although different from those herein described, which are proportioned and arranged with reference to the use of the whole of the parts together; and it is obvious that several parts of my improvement are applicable to various other mowing-machines in use.

One mode of my applying each of my improvements to practical use being shown in this machine, it is unnecessary to specify the manner of applying the parts respectively to other mowing-machines, since the ordinary skill of the constructer will be sufficient for that purpose.

That branch of my improvements which is the subject of this patent consists, first, in hinging the right end of the coupling-arm R to lugs which rise up from the top of the shoe which supports the heel of the finger-beam, in combination with curving up the coupling-arm as it extends toward the machine, whereby the joint of the right end of the coupling-arm is as near the ground as possible, while by curving up the coupling arm all danger of its catching and dragging cut grass is avoided.

It further consists in arranging the draft-hinge of the finger-beam above the plane of the cutters and in advance of the heel of the finger-beam, whereby the joint of the coupling-arm with the shoe is well protected and the heel of the finger-beam guarded against sudden elevations and shocks.

It further consists in hinging the right end of the coupling-arm R to the shoe by a hinge whose axis of motion is on a line with that of the draft-hinge of the finger-beam, which hinge connects with the main frame, in combination with so arranging said hinges as respects the main frame and finger-beam that the strain due to drawing the finger-beam forward will be borne by one end of the main frame, while the lateral strain through the coupling-arm will be borne by the other end of the main frame, whereby the axis of the right hinge of the coupling-arm is the axis of motion of the finger-beam when the outer end thereof is raised above its heel, and whereby the strain on the main frame is divided between the front and rear of the main frame, so that a narrow frame can be used without danger of its being twisted out of shape or broken by the operation of the machine.

In the accompanying drawings, A A A′ A′ represent the main frame of the machine, being of rectangular form, and which is supported on the axles *a a′* of the independent driving and supporting wheels B B′ as it is drawn over the ground by the rigid tongue C.

Spur-wheels D D′ are secured to the inner sides of the spokes of the wheels B B′, the spur-wheel D being secured to wheel B and spur-wheel D′ to wheel B′. The spur-wheels D D′ gear into small pinions E E′, which play loosely on the ends of the main gear-wheel shaft F, which runs in suitable bearings attached to the under side of the central beams, A′ A′, and near the front of the main frame.

To the shaft F there are attached two shields or cases, G G′, within each of which a pawl, *b*, is secured, and these pawls catch into ratchet-teeth on the wheels H, one of which is attached to the inner side of each of the pinion-wheels E E′, or to a disk, E″, which is placed between the ratchet-wheels H and pinion-wheels E E′, for the purpose of closing up the outer ends of the cases G G′, but which are fastened securely to their respective ratchet and pinion wheels, so that each pinion-wheel with its disk or shield E″ and ratchet-wheel H turn together and are loose on the shaft F. (See Figs. 4 and 5.) Small springs *c* are attached to the inside of the cases G G′—one in each case—for the purpose of keeping the pawls *b* in the ratchet-teeth of wheels H when the machine is drawn forward, but which allow the pawls *b* to slip over the teeth on the ratchet-wheels H when the machine is backed, so that gears I and J, crank-shaft K, pitman N N′, and cutters O′ remain stationary when the machine or either side is not advanced forward.

The inner end or heel of the finger-beam P is rigidly secured to the lower double runner or forked ends, Q′ Q′, of a strong metallic draft-shoe or brace-bar, Q, the forward end of which extends upward and forward, and is hinged between lugs *i i* of a wrist or swivel, *i′*, which is free to turn on an axis parallel to the line of motion of the machine in a piece, *j*, attached to piece *j′* by a screw-pivot, the piece *j′* being bolted firmly to the under side of the inner projecting part, A″, of the main frame, while the wrist or swivel-piece *i′* is held in place by nut *k′*.

To sustain the shoe or brace-bar Q in its lateral relative position as respects the main frame, a coupling-arm, R, is hinged at its right end between the lugs R′ R′, which project up from the left side of the shoe or hinged brace-bar Q, while its left end is hinged on a line with the longitudinal center of the crank-shaft K, between lugs *l l*, projecting down from a hanger, R″, which is firmly bolted to the rear under sides of the pieces A′ A′ of the main frame.

The object in curving up the coupling-arm, as shown in the drawings, is to avoid the catching and dragging along of cut grass which may happen to get piled or rolled up by the horses' feet, or from any other cause.

The hinge by which the shoe that supports the heel of the finger-beam is drawn forward is arranged in advance of the cutters and above the frame of the finger-beam, whereby the right hinge of the coupling-arm is well protected from injury as the machine advances, while the heel of the finger-beam is guarded against sudden shocks, since any obstruction in the path of the shoe acts on its front first, and thus gradually raises the heel of the finger-beam, which is free to rise and fall, and also to have a lateral rolling or wabbling motion independent of the main frame.

In order, also, to have the strain on the main frame as equally divided as possible, I hinge the coupling-arm to one end of the main frame, or so that the lateral strain from the finger-beam shall be communicated to the main frame on the opposite side of the axes of the supporting-wheels from that which bears or receives the strain due to the draft of the finger-beam. In other words, I so connect the shoe to which the finger-beam is attached as that the strain necessary to draw or carry the finger-beam forward shall be sustained by one end of the main frame or on one side of the axes of the supporting-wheels, while the lateral strain through the coupling-arm, which is hinged to the main frame on a line with a longitudinal center of the finger-beam, as fully shown in the drawings, shall be sustained by the opposite end of the main frame. One way in which this can be done is shown in this machine, where the shoe is extended forward so as to form a brace, and is connected by a yielding connection to the front of the machine, while the coupling-arm is hinged to the rear of the machine.

By placing the right hinge of the coupling-arm nearly as low as the bottom of the finger-beam and at its heel, the up-and-down motion of the outer end of the finger-beam is more free and unrestrained than if the hinge were on top of the finger-beam, since in the latter case that portion of the finger-beam below the hinge would act as a lever to resist the free rising of the outer end of the finger-beam. Consequently the nearer the hinge is to the ground the less leverage or resistance there will be to the free rising of the outer end of the finger-beam.

I do not deem a more detailed description of the machine necessary, since parts of my said machine are more fully set forth in other patents to me of even date herewith.

What I claim under this patent as my invention is—

1. Hinging the right end of the coupling-arm R to the lugs R′ R′, in combination with curving up the coupling-arm as it extends toward the machine, substantially as shown and set forth.

2. The combination of the shoe or brace-bar which supports the heel of the finger-beam with the hinge by which it is drawn, arranged above the plane of the cutter and in advance of the heel of the finger-beam, substantially as set forth.

3. Connecting the coupling-arm to the shoe by a hinge whose axis of motion is on a line with that of the draft-hinge of the finger-beam, in combination with so arranging said hinges as respects the main frame as that the strain due to the draft or drawing of the finger-beam forward will be borne by one end of the main frame and on one side of the axes of the driving and bearing wheels, while the lateral strain through the coupling-arm will be borne by the other end of the main frame and on the other side of the axes of the driving and bearing wheels.

In witness whereof I have hereunto signed my name.

EPHRAIM BALL.

Witnesses:
DANIEL GOTSHALL,
D. H. HARMER.